2,758,930
Patented Aug. 14, 1956

2,758,930

METHOD OF PRESERVING SHRIMP

Harry A. Toulmin, Jr., Dayton, Ohio, assignor to The Commonwealth Engineering Company of Ohio, Dayton, Ohio No Drawing. Application April 9, 1953,
Serial No. 347,848

3 Claims. (Cl. 99—158)

This invention relates to the art of preserving peeled shrimp.

It it known that the quality of peeled shrimp tends to deteriorate between the time the shrimp are peeled and cleaned and the time they are consumed. Frequently, a large portion of the delicate flavor of the shrimp is lost, apparently due to loss in the ester content which normally imparts a savory fragrance to the shrimp. This deterioration in the shrimp quality is not prevented by canning or otherwise packaging the peeled shrimp in brine.

It is an object of this invention to provide a method of treating shrimp to preserve and enhance their appearance, color and flavor and also to preserve the desirable, appetizing crisp and tender texture of the meat.

It is another object to provide a simple, economical method of preserving shrimp meat to maintain the same for long periods of time in a fresh, wholesome condition and free from noxious odors.

It is also an object of the invention to provide an improved method by means of which peeled shrimp may be so treated or prepared that the cleaned and dressed meat may be transported to local or distant markets, or stored in shops or in the home for appreciable periods of time, without loss of its original freshness and without undergoing deterioration or decay, and with its natural juices, proteins, tenderness and flavor unimpaired.

In accordance with the invention, these and other objects are accomplished by treating cleaned, peeled shrimp, with an aqueous medium containing a water-dispersible, including water-soluble dextran.

The dextrans are high molecular weight polysaccharides made up of anhydroglucopyranosidic groups or units linked together by molecular structural repeating linkages some of which are alpha-1,6 linkages and some of which are alpha-non-1,6 linkages and, apparently, at least 50% of the linkages being of the alpha-1,6 type. The properties of the dextrans, including the molecular structural repeating alpha-1,6 to alpha-non-1,6 linkages ratios, the molecular weight, the water sensitivity, and the osmotic pressure in liquids vary.

The dextrans may be produced bacterially, for example by inoculating a nutrient medium containing sucrose, particular nitrogenous compounds and certain inorganic salts, with an appropriate microorganism, such as those of the *Leuconostoc mesenteroides* and *L. dextranicum* types and incubating the culture at the temperature most favorable to the growth of the particular microorganisms. The dextrans thus obtained usually have a high molecular weight, calculated to be in the millions, and may be soluble in water or insoluble therein but dispersible in aqueous media.

In one method of obtaining a dextran for use in practicing this invention, there is first prepared an aqueous nutrient medium which may have the following composition:

| | Percent by weight |
|---|---|
| Sucrose | 20 |
| Corn steep liquor | 2 |
| Monobasic potassium phosphate | 0.5 |
| Manganous sulfate | 0.002 |
| Sodium chloride | 0.50 |
| Water | Balance |

This medium is adjusted to a pH of between about 6.5 and about 7.5, preferably 7.2, and then sterilized. The material is cooled to room temperature and inoculated with a culture of the dextran-producing bacteria, for example, *Leuconostoc mesenteroides* B–512 (Northern Regional Research Laboratory classification) and incubated at 20° to 30° C. (optimum 25° C.) until a maximum yield of dextran has been attained; normally a period of between 12 and 48 hours will be satisfactory for this procedure. The fermented product contains approximately 80–85% of water and is a thick turbid liquid.

Upon completion of the fermentation, which process renders the material somewhat acid, that is, to a pH of 3.5–5.5 (average 4.2), calcium chloride is added to the ferment to bring the pH thereof to about 7.0 to 8.0. This aids in the precipitation of phosphates. Thereafter, acetone or alcohol, which may be a water-miscible aliphatic, such as methyl, ethyl or isopropyl, is added in sufficient quantity to precipitate the dextran and this brings down, with the dextran, occluded and adsorbed bacteria, and nitrogenous and inorganic elements. To occasion complete precipitation of the dextran it may be desirable to allow the mix to stand for a relatively long period, such as about 6 hours. The precipitated dextran may be dried in any suitable manner, for example by drum drying. Thereafter, it may be reduced to particulate condition which is the preferred form in carrying out the reaction with the carboxymethylating agent.

A purer dextran may be obtained by adding an aliphatic alcohol to the fermented culture at a pH between about 2.5 and 4.5. The precipitate thus obtained may be further purified by again precipitating it with the alcohol. Several precipitations may be performed.

The dextran thus produced is a so-called "native" dextran having a high molecular weight and being, in the particular case, soluble in water at ordinary temperatures.

Such a "native" high molecular weight dextran may be employed for the present purpose of protecting and preserving the peeled shrimp.

In the alternative, a dextran having, initially, a high molecular weight, may be hydrolyzed in any suitable manner, as by means of acid or enzymatically, to a product of lower molecular weight and the hydrolyzed dextran may be used to treat the shrimp. For instance, the "native" dextran obtained as described above may be hydrolyzed to a product having a lower molecular weight or average molecular weight, for instance an average molecular weight in the range between 20,000 and 200,000, and this product may, if desired, be fractionated to obtain a fraction of pre-selected uniform or more nearly uniform molecular weight in the stated range. The fraction of pre-selected molecular weight may, if desired, be treated by known methods for the removal of pyrogen and coloring materials. The dextran used in preparing the treating medium may be a so-called "clinical" dextran.

The dextran may be obtained by inoculating the culture medium with microorganisms other than *Leuconostoc mesenteroides* B–512. Thus, it may be, for instance, a water-soluble dextran obtained by inoculating the nutrient medium with any one of the microorganisms bearing the following NRRL classifications: *Leuconostoc mesenteroides* B–119, B–1146, B–1190; or it may be a water-insoluble or substantially water-insoluble dextran obtained by inoculating the nutrient medium with the microorganism *Leuconostoc mesenteroides* B–742, B–1191, B–1196, B–1208, B–1216, B–1120, B–1144 or B–523, *Streptobacterium dextranicum* B–1254, or *Betabacterium vermiforme* B–1139, and which is dispersible in water or aqueous medium.

The invention is not predicated on or limited to the use of a dextran prepared under any particular set of conditions or using any particular microorganism. It may be produced enzymatically, in the substantial absence of bacteria, by cultivating an appropriate microorganism, for example, *Leuconostoc mesenteroides* B–512 to obtain a dextran-producing enzyme, separating the enzyme from the medium in which it is produced, and introducing the enzyme into a medium in which dextran is produced by the action of the enzyme. Also, the dextran may be obtained by bacterial conversion of 1,4 linkages of dextrin to 1,6 linkages of dextran. The molecular weight of the dextran is not critical for the present purposes.

In proceeding in accordance with the invention, the shrimp bodies are shelled, the sand veins are removed, and the bodies are washed to remove sand, grit or other foreign matter. It is generally regarded as desirable to accomplish the shelling, deveining, and cleaning processes in the shortest possible time in order to curtail the exposure of the shrimp bodies to normal humidity and temperature conditions.

The next step in the processing depends on whether the shrimp are to be pre-cooked before being treated with the dextran-containing medium. If cooking is to precede the preserving treatment, it may be desirable to perform the cooking after soaking the shrimp in a saline or common salt solution, or in a solution of salt and sugar which may or may not contain spices according to the flavor desired in the finished product, or the cooking may be performed while the shrimp are immersed in the saline or saline-sugar solution. In either case, whether the shrimp are cooked while immersed in the saline solution or not, the cooking is performed, perferably, at a moderate temperature. If the heating takes place while the shrimp are in the saline solution, temperatures in the range of 170° F. to 210° F., which are below the boiling point of the saline solution may be used. Presuming the shrimp are to be pre-cooked before the dextran treatment, and that it is desired to cook them during or after steeping thereof in a saline or flavoring solution, a convenient method of handling the shrimp meat is to advance it in suitable containers through successive baths, including in sequence, the bath of the saline or saline-sugar solution, a separate heated bath in which the meat is pre-cooked, and finally a bath for washing out excess salt and flavoring materials which may have been present in the steeping bath. The time of immersion in each bath may be controlled by the speed of the advancing means or the length of the path of the shrimp meat container through each bath. The heated bath may be heated in any suitable manner, such as by a gas flame or by electrical resistance elements disposed around or immersed in the bath. Thermostatic controls may be utilized to control the temperature at which the meat is cooked. The washed shrimp may then be dried and treated with the aqueous medium containing the dextran whereby they are given an over-all coating of dextran which, after drying, for example in the air, serves to maintain the shrimp in peak condition by protecting them against bacterial action resulting in spoilage, by sealing in, and preventing dehydration and toughening of the texture.

It will be understood that the method described involving steeping shrimp bodies in saline or saline-sugar solution and heating to effect cooking in the presence or absence of salt or salt and sugar, is exemplary only, and that the shrimp may be pre-cooked under other conditions, with or without prior immersion in a spicing or flavoring bath.

It will also be understood, of course, that the shrimp meat may not be pre-cooked at all before it is provided with a protective film or coating of dextran. Thus, following the shelling, deveining and cleaning steps, the shrimp bodies may be treated in the "raw" condition with the aqueous medium containing the dextran. The dextran solution or dispersion may be applied to the shrimp bodies in any appropriate or convenient manner as by dipping the bodies into the medium, by brushing or spraying the medium thereon, or by placing the bodies on a reticulated endless conveyor moving through the medium.

The concentration of dextran in the treating medium may vary and may be, for instance, between 0.5% and 20% by weight. Concentrations of between 0.5% and 10% are satisfactory. The treatment is preferably performed at ordinary room temperature.

After the shrimp bodies have been treated with the dextran-containing medium, they may be allowed to dry, preferably in the air at normal temperatures. The shrimp thus treated are encased in an over-all dextran coating and may be packaged for shipment, for instance in cellophane or similar transparent bags or containers, in which they may be displayed and marketed. While the shrimp bodies carrying the protective dextran coating may be quick-frozen and shipped and marketed in the frozen state, or maintained under cold storage conditions during storage or in the display cases, as is common practice, these precautions with respect to freezing or refrigeration are not as essential to the keeping properties of the shrimp bodies carrying a dextran coating, and may be dispensed with, since the dextran coating affords the meat a substantial degree of protection against deterioration or spoilation under normal atmospheric conditions.

The dextrans are ideally suited for the present purpose. In the pure state, they are bland, non-irritating, non-toxic materials which do not support bacterial life. Although, if desired, the dextran may be removed from the shrimp bodies very readily by merely washing the bodies with water, and will be dissolved or sloughed off if the meat is cooked after the dextran is applied thereto, the dextrans are edible, assimilable substances and therefore may be consumed with the shrimp meat without deleterious effect.

The shrimp bodies resulting from treatment with the dextrans are a greatly improved shrimp product, as may be determined by visual observation as well as by taste. Such shrimp retain, to a pronounced degree, the characteristically mottled pink of freshly netted and peeled shrimp, and the flesh has a firm, yet crisp and tender, texture.

Although the invention has been discussed in detail in connection with the use of dextran as the essential ingredient of the aqueous treating medium, various water-soluble or water-dispersible conversion products of dextran may be substituted therefor. Useful conversion products include carboxyalkyl, more espectially carboxymethyl dextrans in which the ratio of carboxymethyl groups to anhydroglucopyranosidic units is from less than 1:1 to 3:1 and which may be water-soluble or water-dispersible depending on the degree of substitution and the dextran which is etherified, dextran alkyl and aryl ethers, dextran esters, and alkali metal and alkaline earth metal substitution product of the dextrans such as water-soluble or water-dispersible calcium substitution products.

Various other modifications and variations may be made in practicing the invention. For instance, instead of treating the shrimp bodies to provide them with a dry, hardened dextran coating, the peeled, deveined and cleaned shrimp may be packaged, for example canned, in an aqueous solution or dispersion of a dextran, and shipped and marketed in the can. Such methods, involving the shipping of the preservative solution with the shrimp are usually resorted to as a measure of expediency in an attempt to maintain the freshness and flavor of the shrimp. They entail large shipping charges and are rendered unnecessary by the present invention. Also, the dextran-containing medium of the invention may be modified by the incorporation of adjuvants such as substances which in and of themselves tend to have a preservative active on the shrimp and which are compatible with the dextran or dextran conversion product. Illustratively, the dextran may be dissolved or suspended in aqueous saline solution, the salt also serving as a seasoning material. Other adjuvants which may be included in the dextran solution or suspension are spices and flavoring ingredients which may be used in small amounts of 0.1% to 2% on the weight of the treating medium and selected with a view to their purpose, namely, to destroy or overcome all possibility of a fishy flavor or aroma, and in addition to bring out and enhance the natural flavor of the fresh shrimp. Suitable flavoring ingredients include pepper, thyme, bay, vinegar and the like. All such variations and modifications in the specific details discussed herein may be made without departing from the spirit and scope of the invention and, therefore, it is to be understood that the invention is not to be limited except as defined in the appended claims.

I claim:

1. The method of preserving peeled and cleaned shrimp which comprises contacting the shrimp with an aqueous medium consisting essentially of an 0.5% to 20% aqueous dispersion of water-dispersible dextran, said dextran having a molecular weight between 20,000 and that of the native, unhydrolyzed dextran.

2. The method of preserving peeled and cleaned shrimp which comprises contacting the shrimp with an aqueous medium consisting essentially of an 0.5% to 20% aqueous dispersion of water-dispersible native, unhydrolyzed dextran.

3. The method of preserving peeled and cleaned shrimp which comprises contacting the shrimp with an aqueous medium consisting essentially of an 0.5% to 10% aqueous dispersion of water-dispersible native, unhydrolyzed dextran.

References Cited in the file of this patent

UNITED STATES PATENTS

| | | |
|---|---|---|
| 2,089,217 | Mahoney | Aug. 10, 1937 |
| 2,203,705 | Stahley et al. | June 11, 1940 |
| 2,229,941 | Stahley et al. | Jan. 28, 1941 |
| 2,337,645 | Cadwell | Dec. 28, 1943 |
| 2,470,281 | Allingham | May 17, 1949 |
| 2,488,184 | Garnatz et al. | Nov. 15, 1949 |
| 2,518,135 | Gaver | Aug. 8, 1950 |
| 2,567,085 | Stoloff | Sept. 4, 1951 |
| 2,600,627 | Envoldsen | June 17, 1952 |
| 2,622,034 | Wills | Dec. 16, 1952 |
| 2,627,466 | Lewis | Feb. 3, 1953 |
| 2,669,520 | Fellers | Feb. 16, 1954 |

FOREIGN PATENTS

| | | |
|---|---|---|
| 15,790 | Great Britain | of 1903 |